(12) United States Patent
Yang et al.

(10) Patent No.: US 10,356,988 B2
(45) Date of Patent: Jul. 23, 2019

(54) METHOD FOR CULTURING OPHIOCORDYCEPS SINENSIS

(71) Applicants: Tunghai University, Taichung (TW); Greenyn Biotechnology Co., Ltd, Taichung (TW)

(72) Inventors: Fan-Chiang Yang, Taichung (TW); Yi-Chuan Shih, Taichung (TW)

(73) Assignees: Tunghai University, Taichung (TW); Greenyn Biotechnology Co., Ltd, Taichung (TW)

(*) Notice: Subject to any disclaimer, the term of this patent is extended or adjusted under 35 U.S.C. 154(b) by 512 days.

(21) Appl. No.: 15/132,912

(22) Filed: Apr. 19, 2016

(65) Prior Publication Data

US 2016/0345504 A1    Dec. 1, 2016

(30) Foreign Application Priority Data

May 29, 2015    (TW) ............................. 104117498 A (51) Int. Cl.
    *A01G 18/00*    (2018.01)
(52) U.S. Cl.
    CPC .................................. *A01G 18/00* (2018.02)

(58) Field of Classification Search
    CPC ...................................................... A01G 18/00
    See application file for complete search history.

(56) References Cited

FOREIGN PATENT DOCUMENTS

CN    2001-602628    *    9/2001

OTHER PUBLICATIONS

Dong et al., J. Ind. Microbiol. Biotechnol., 2011, vol. 38, p. 1027-1035.*

* cited by examiner

*Primary Examiner* — Kade Ariani
(74) *Attorney, Agent, or Firm* — Muncy, Geissler, Olds & Lowe, P.C.

(57) ABSTRACT

This present invention disclosed a method for culturing *Ophiocordyceps sinensis* by inoculating a fungus inoculum onto a medium, culturing with a culturing condition in the dark room, and then culturing under the light for at least four weeks. According to the method for culturing *O. sinensis* disclosed in this present invention, the cultured *O. sinensis* has better growth rate and its composition and content of active ingredients are similar with wild *O. sinensis*.

11 Claims, 8 Drawing Sheets

METHOD FOR CULTURING *OPHIOCORDYCEPS SINENSIS*

The current application claims a foreign priority to application number 104117498 filed on May 29, 2015 in Taiwan.

BACKGROUND OF THE INVENTION

1. Field of the Invention

This invention relates to a method for culturing fungus, specially relates to a method for culturing *Ophiocordyceps sinensis*.

2. Description of the Related Art

*Ophiocordyceps sinensis*, also called Chinese caterpillar fungus, is a complex of fungus that parasitizes ghost moth larvae and produces a fruiting body. Its value as a medicine had been record in the history. In traditional Chinese medicine, *O. sinensis* has yin-nourishing and yang-invigorating actions of human body. Inborn weakness body characteristics can be improved by often eating it. So, *O. sinensis* is the best traditional herbal medicine to prolong life or benefit body. Modern medical researches indicated that *O. sinensis* has many ingredients such as cordyceps polysaccharide, amino acids, D-mannitol, cordycepin, alkaloid, minor elements, adenosines to make it has many physical activities including immune regulation, anti-tumor, anti-bacterium, anti-virus, liver protection, endocrine regulation, depression of central nerve system and regulation of cardiovascular, kidney, and respiratory tract. Because wild *O. sinensis* grow at the environment of high, cold, low-oxygen, and low-pressure, *O. sinensis* has been known as one of the most treasurable medicine.

Early researches found that *Hirsutella sinensis* can complete whole process from infection to fructification after inoculating swift moth larva. It proved that *H. sinensis* is the anamorph of *O. sinensis*. In order to improve the defect of wild *O. sinensis* gathering difficulty and expensive costs, many researches used fermentation technology to develop *O. sinensis*. Generally speaking, fermentation technology includes liquid state fermentation and solid state fermentation. Solid state fermentation has advantages such as suitable for fungus, high yield, easy equipment, little waste solution and environment pollution, easy-controlled production costs.

Although prior researches revealed solid state fermentation have more advantages for *O. sinensis* development, but only few of researches focus on developing fermentation technique of *O. sinensis*. And the culture conditions of solid state fermentation, such as medium composition, temperature, humidity, light, will affect productivity of *O. sinensis* and its content of active ingredients, respectively. Accordingly, artificial culture method for constantly producing *O. sinensis* and isolating specific active ingredients is still not available so far. Therefore, development and utility of *O. sinensis* is getting harder and harder, and the product price of *O. sinensis* is still expensive and the demand for *O. sinensis* is over supply on the market.

SUMMARY OF THE INVENTION

The major propose of this present invention is to provide a method for culturing *O. sinensis* which can largely increase the content of alkaloid to benefit the development and production of healthcare product by regulating artificial culture environment.

Another purpose of this present invention is to provide a method for culturing *O. sinensis* which can produce solid state *O. sinensis* through artificial culture to make the ingredient and the content of the cultured *O. sinensis* very close to wild *O. sinensis*.

Further another purpose of this present invention is to provide a method for culturing *O. sinensis* which can stabilize the production quality of *O. sinensis* and increase the production rate of *O. sinensis*.

In order to achieve these foresaid purposes, this present invention discloses a method for culturing *O. sinensis* including (a) inoculating a fungus inoculum onto a medium; (b) culturing with a culturing condition in the dark room; and (c) culturing under the light for at least four weeks.

Preferably, the intensity of the light is 300~500 lux.

Preferably, the culturing condition includes humidity of 70~90% and temperature of 15~25° C. In an embodiment of this present invention, the temperature is at 20° C.

Preferably, the duration of culturing in the dark room is at least four weeks. In one embodiment of this present invention, the content of cordycepin can be higher when the duration is six weeks.

Preferably, the water content of the medium is 50~60%.

Preferably, the medium includes a powder substrate and a nitrogen source. The powder substrate is prepared by at least one plant from mixed grains, and the nitrogen source is selected from yeast extraction, peptone or the combination thereof. For example, the powder substrate is prepared from oat, soybean, barley, maize, wheat, rice, rye or the combination of the above two or more.

Preferably, the duration of culturing under the light is four to twelve weeks, such as four, eight, twelve weeks. The examples of this present invention disclosed that the longer duration of light culture can produce higher content of cordycepin and mycelium from *O. sinensis*.

DETAILED DESCRIPTION OF THE INVENTION

This present invention discloses a method for culturing *O. sinensis* which through regulating the artificial solid state culture environment to make the artificial cultured *O. sinensis* has similar ingredients with wild *O. sinensis* and to make the mycelium grow fast and stable for supplying demand on the market.

It is well known by the person skilled in the art of this present invention that the growth environment of wild *O. sinensis* is very complex. Therefore, in order to culture the *O. sinensis* having similar ingredients and compositions with wild *O. sinensis* and increase its growth rate, it should use a true *O. sinensis* strain and consider various environment factors.

The solid state medium for culturing *O. sinensis* comprises substrate, nitrogen source and metal ion. For example, the nitrogen source can be yeast extraction, peptone or combination thereof. The substrate can be the plant from mixed grains for carbon source, such as oat, soybean, barley, maize, wheat. Furthermore, the water content of the medium will affect the growth of *O. sinensis*. Generally speaking, the water content of 50~60% is preferable. When the water content is 50%, white hyphae of *O. sinensis* grow at surface of substrate after culturing about 5~7 days and more culturing for 18~20 days, hyphae will attach on the whole surface of substrate with a predetermined thickness. When the water content is 60%, hyphae of *O. sinensis* grow obviously after culturing for about 14~16 days.

Because air exchange in the culture container is beneficial for growth of fungus hyphae, the container for culturing *O. sinensis* needs to have high air permeability for good air exchange between inside and outside of the container to promote a better growth. For instance, the container is just like the one disclosed in the Taiwan model patent M468890, test tube or box having air channel, or container having hydrophobic membrane.

Humidity and temperature are factors affecting growth of *O. sinensis*, wherein low humidity is not conducive to *O. sinensis*. growth because of the medium drying fast. On the other hand, high humidity is beneficial for growth of *O. sinensis*. Therefore, humidity control device is often used in the dry culture environment, such as humidifier. Overall speaking, humidity of 70~90% and temperature of 15~25° C. are preferable.

Hereinafter, there are several examples with figures for further illustrating the effect of this present invention. But these examples are only for exemplifying this present invention, not to limit the explanation of specification and claim of this present invention.

The *O. sinensis* adopted in the following examples is from food industry research and development institute (FIRDI, Hsinchu, Taiwan) with deposition No. BCRC 37843.

Example 1: Preparing *O. sinensis* Inoculum

*O. sinensis* (BCRC 37843) bought from FIRDI was cultured on plate and slant medium at 15~22° C. for 40~70 days, and then preserved it in 4° C. refrigerator. Herein, potato glucose agar of 39 g/L concentration at temperature 20° C. for 60 days is preferable.

The cultured *O. sinensis* was sliced and inoculated onto a medium of pH 6.0, then homogenized it and cultured to gain *O. sinensis* inoculum, wherein the medium including sucrose, yeast extraction and peptone, the culture temperature of 25° C., the incubator at 120 rpm and culturing for 18 days is preferable.

Example 2: Preparing Culture Medium

About 15 grams of mixed grains for solid-state carbon source were smashed into pellets with proper size by machine for the culture substrate. Size of these pellets were preferable for 20~30 meshes. Preparing a culture solution with preferable formula of 2% glucose, 1% nitrogen source, 0.01 magnesium sulfate ($MgSO_4$), 0.01% monopotassium phosphate ($KH_2PO_4$), wherein the nitrogen source could be yeast extraction or peptone. The culture medium will be obtained by adding the culture solution into the culture substrate.

Example 3: Examining the Content of Cordycepin and Adenosine

Figure 1:
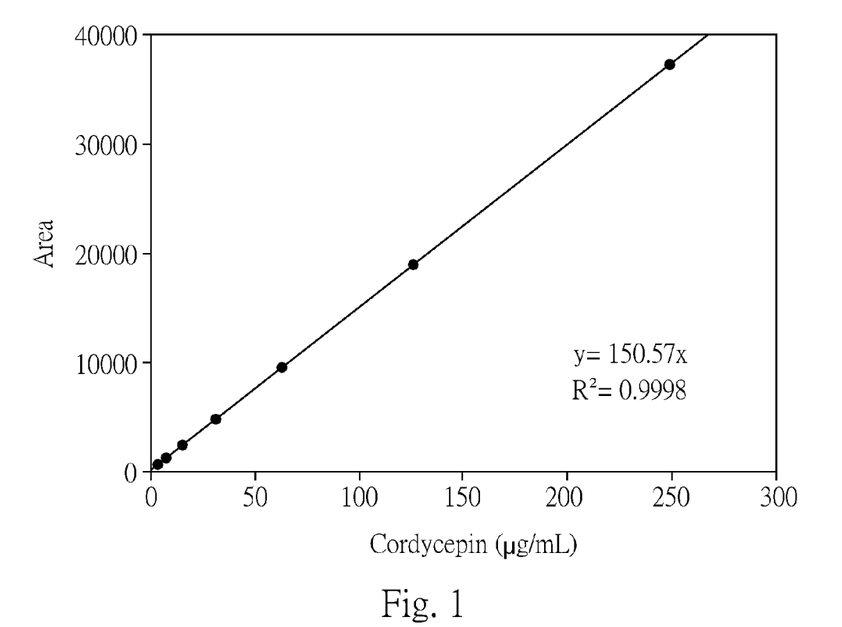
FIG. 1 is the standard calibration curve of cordycepin.
Figure 2:
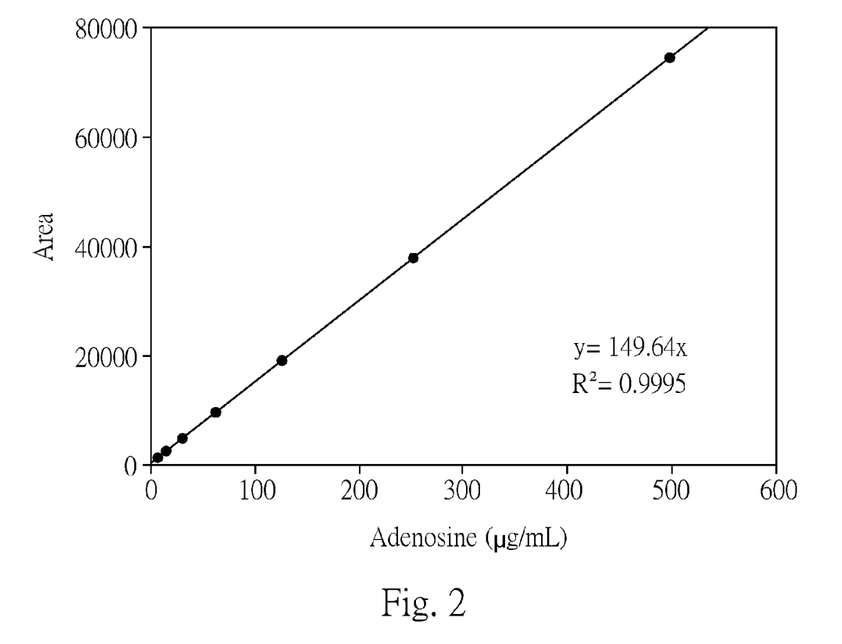
FIG. 2 is the standard calibration curve of adenosine.

Concentration 200, 400, 600, 800, 1000 μg/mL of standard solutions were prepared by mixing the standard cordycepin or standard adenosine with 15% methanol, respectively. Analyzing the each standard solution by high performance liquid chromatography (HPLC), it respectively drawn the standard curves of cordycepin and adenosine, as shown in FIGS. 1 and 2. The condition of HPLC was as following: Luna C18 column (5 μm, 4×250 nm), 254 nm wavelength, 0.4 mL/min flow rate, flow phase methanol mixed 0.02M potassium phosphate ($K_3PO_4$) according to ratio of 15:85 and 20 μL injection volume.

0.1 gram sample powder and 5 mL methanol were loaded into a centrifuge tube, extracted by 100° C. boiling water, and then centrifuged at 7000 rpm for 10 min. 1.5 mL of the solution was centrifuged again at 7000 rpm for 10 min and filtered by 0.22 μm filter membrane. The filter solution was analyzed by HPLC under the same condition of the standards. The content of cordycepin and adenosine in the sample could be measured by the standard curves of cordycepin and adenosine.

Figure 3:
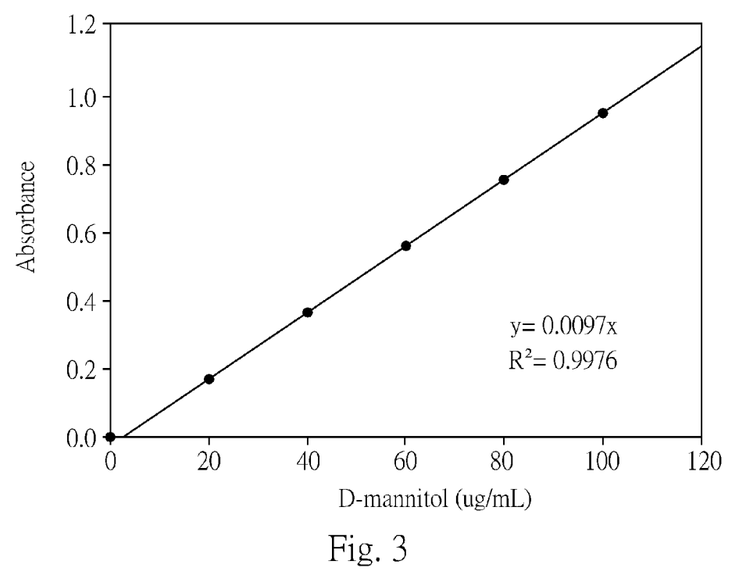
FIG. 3 is the standard calibration curve of mannitol.

Example 4: Examining the Content of Mannitol 0.25 gram sample powder and 100 mL distilled water were loaded into a centrifuge tube. The centrifuge tube was put into 80° C. circulator for about an hour, and then centrifuged by 7000 rpm for 10 min. 1 mL supernatant was taken into another centrifuge tube, added 1 mL sodium periodate ($NaIO_4$), mixed well, stayed at room temperature for 10 min, added 2 mL, 0.1% L-rhamnose, and then mixed well. 4 mL new Nash reagent was added, and then mixing well. The centrifuge tube was put into 53° C. circulator until the color changed, and then calmed down to room temperature. The absorbance was detected by spectrophotometer at 415 nm wavelength. According to the standard curve shown as FIG. 3, it can measure the concentration of mannitol in the sample.

Example 5: Light Test I

Based on the description in example 2, the prepared medium was put into a culture container. 20% of the total amount of *O. sinensis* inoculum from example 1 was inoculated into the culture container. Dark culture was proceeded at 20° C. and humidity was 70~80% until mycelia grew all over the surface of the medium, and then proceeded dark culture for 4, 5, 6, 7, 8, 9 weeks, respectively. The end of the dark culture is the initiation point of light culture. After finish the dark culture for different weeks, it started light culture from the initiation point.

wherein the light was from white lamp with 300~500 lux for 4, 8, 12 weeks, respectively. Finally, each of the *O. sinensis* cultured under different condition was collected, dried at 45° C. temperature and ground to test the content of adenosine, cordycepin and mannitol. The results are shown as FIGS. 4 to 12.

FIGS. 4 to 12 indicated that the light time and the initiation point of light culture affected the content of active ingredient in *O. sinensis*.

Figure 4:
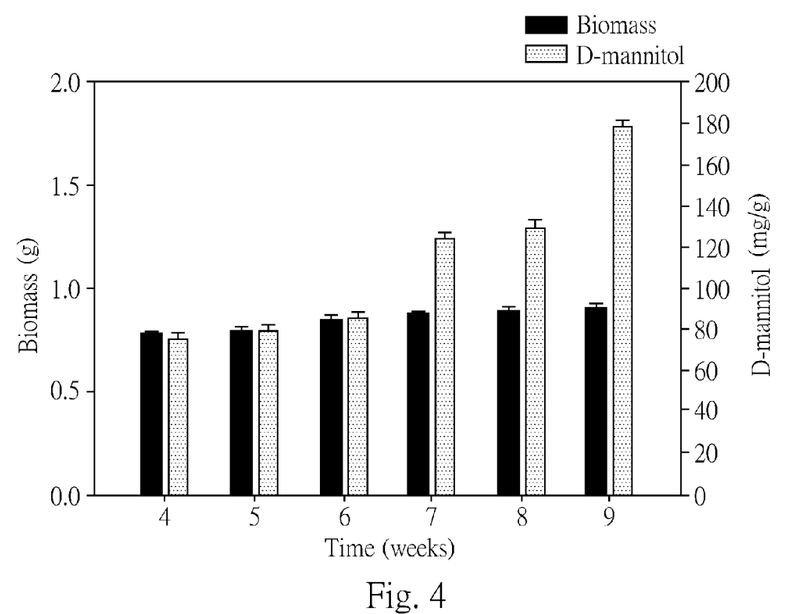
FIG. 4 is the content of mannitol and the total amount of hyphae tested after four weeks under the light from different initiate point.

Result in FIG. 4 shown that the content of mannitol in *O. sinensis* was increased slowly, when *O. sinensis* was cultured for 4, 5 and 6 weeks of dark culture, respectively, and then for 4 weeks of light culture. However, when *O. sinensis* was cultured in the dark for at least 7 weeks and then cultured under the light for 4 weeks, the content of mannitol in *O. sinensis* was increased significantly. And, the content of mannitol in *O. sinensis* was increased in accordance with increasing weeks of the initiation point of light culture. It found that when *O. sinensis* was cultured in the dark for 9 weeks and then under the light for 4 weeks, the content of mannitol in *O. sinensis* was the highest.

Figure 5:
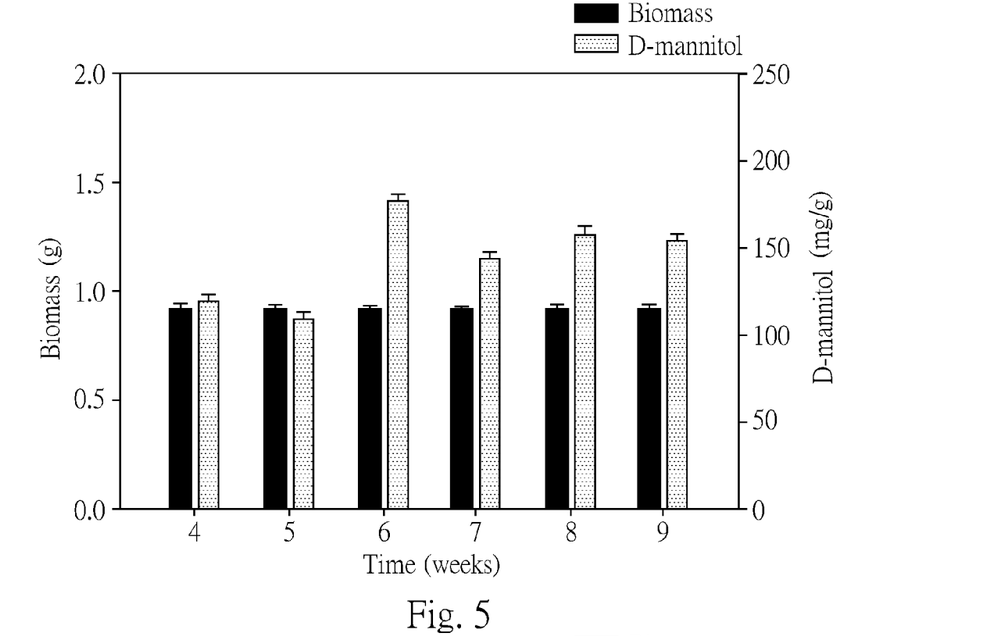
FIG. 5 is the content of mannitol and the total amount of hyphae tested after eight weeks under the light from different initiate point.

Result in FIG. 5 shown that culturing *O. sinensis* in the dark for 4 or 5 weeks and then under the light for 8 weeks, the content of mannitol in *O. sinensis* was increased slowly at the early stage. When culturing *O. sinensis* in the dark for 6 weeks and then under the light for 8 weeks, the content of mannitol in *O. sinensis* was increased quickly. But when *O. sinensis* was cultured under the light for 8 weeks after 9 weeks of dark culture, it would decrease the physical activity of *O. sinensis*.

Figure 6:
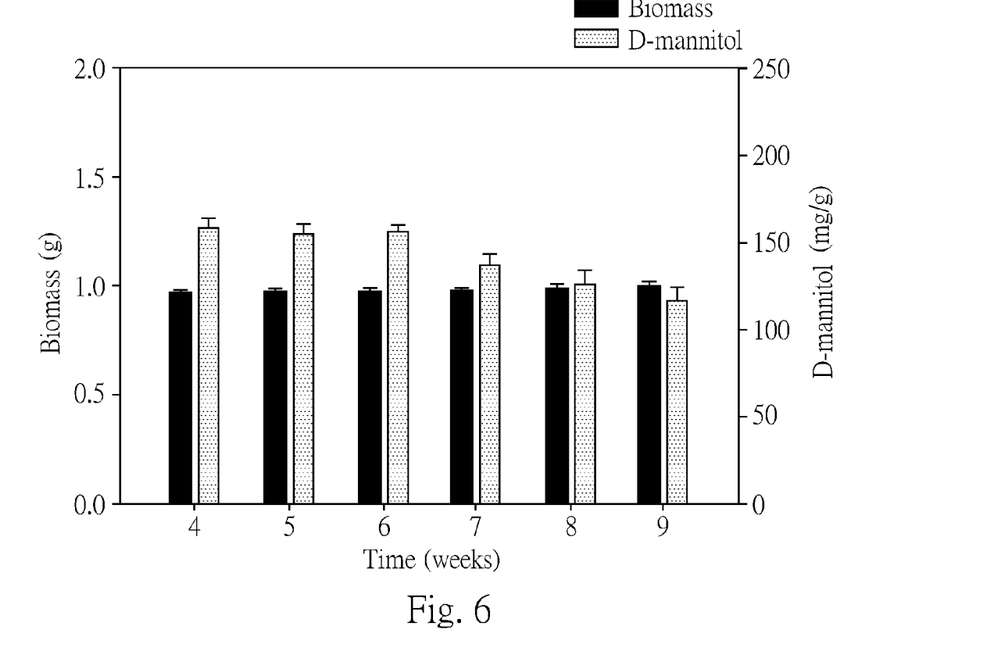
FIG. 6 is the content of mannitol and the total amount of hyphae tested after twelve weeks under the light from different initiate point.

Refer to FIG. 6. When *O. sinensis* was cultured in the dark for 4 or 5 weeks and then under the light for 12 weeks, the content of mannitol in *O. sinensis* was continuously increased. And when *O. sinensis* was cultured 6, 7, 8 or 9 weeks of dark culture and then 12 weeks of light culture, the content of mannitol in *O. sinensis* was continuously decreased.

Taking the results from FIGS. 4 to 6 into consideration, light culture after 6 weeks of dark culture can increase the content of mannitol in *O. sinensis*, wherein 8 weeks of light culture after 6 weeks of dark culture can cause the highest content of mannitol in *O. sinensis* with about 181.55 mg/g concentration.

Figure 7:
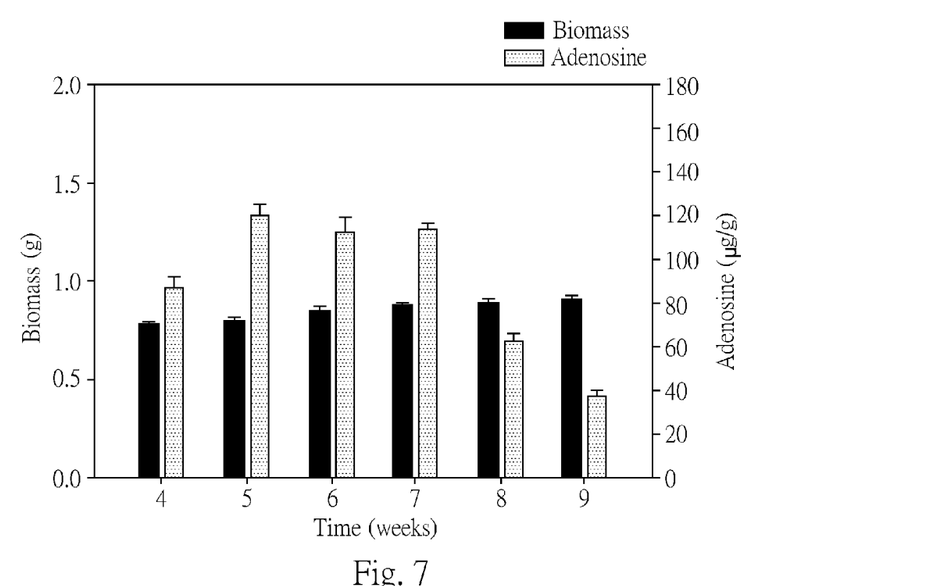
FIG. 7 is the content of adenosine and the total amount of hyphae tested after four weeks under the light from different initiate point.

Result in FIG. 7 shown that when *O. sinensis* cultured 4 weeks of light culture after 4, 5, 6 weeks of dark culture, respectively, it would increase the content of adenosine in *O. sinensis*. However, when *O. sinensis* cultured 4 weeks of light culture after 7, 8, 9 weeks of dark culture, respectively, the content of adenosine in *O. sinensis* was decreased with the increasing weeks of dark culture.

Figure 8:
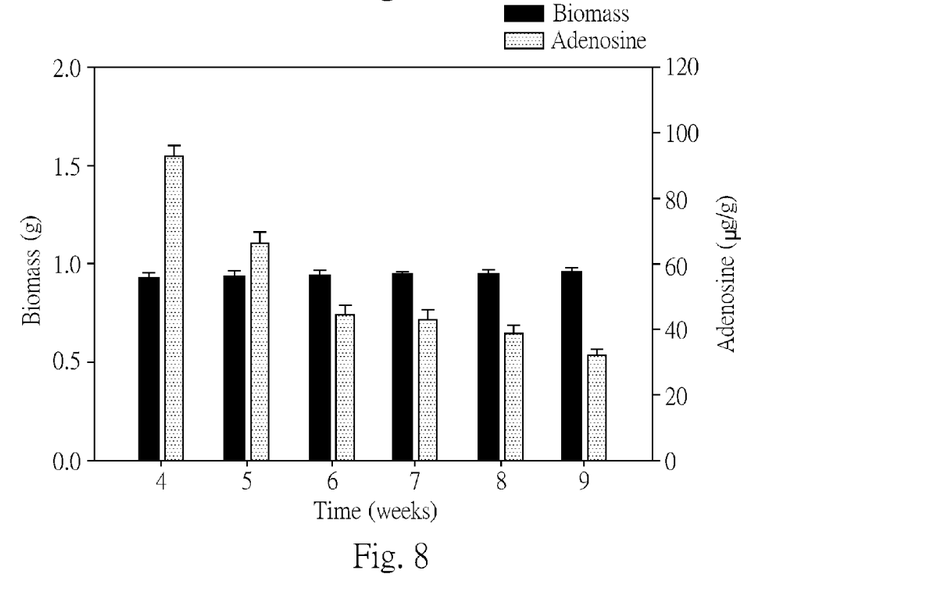
FIG. 8 is the content of adenosine and the total amount of hyphae tested after eight weeks under the light from different initiate point.

Result in FIG. 8 shown that when 8 weeks of light culture, the content of adenosine in *O. sinensis* was gradually decreased with the increasing weeks of dark culture. Herein, the content of adenosine in *O. sinensis* was the lowest when the period of dark culture was 9 weeks. Result in FIG. 9 shown that culturing in the light was for 12 weeks, it would decrease the content of adenosine in *O. sinensis* gradually with the increasing weeks of dark culture, and when culturing in the dark for 9 weeks, the content of adenosine in *O. sinensis* was the lowest.

Figure 9:
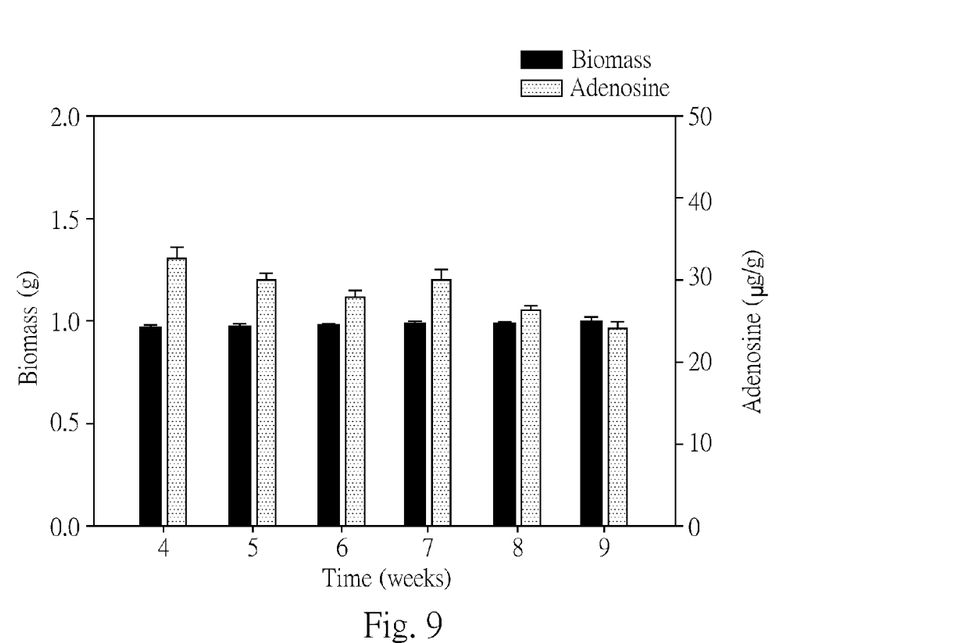
FIG. 9 is the content of adenosine and the total amount of hyphae tested after twelve weeks under the light from different initiate point.

According to FIGS. 7 to 9, after culturing *O. sinensis* in the dark for 5 weeks and then in light, it could increase the content of adenosine in *O. sinensis*, wherein 4 weeks of light culture could cause the highest content of adenosine in *O. sinensis* with about 120.50 µg/g concentration.

Figure 10:
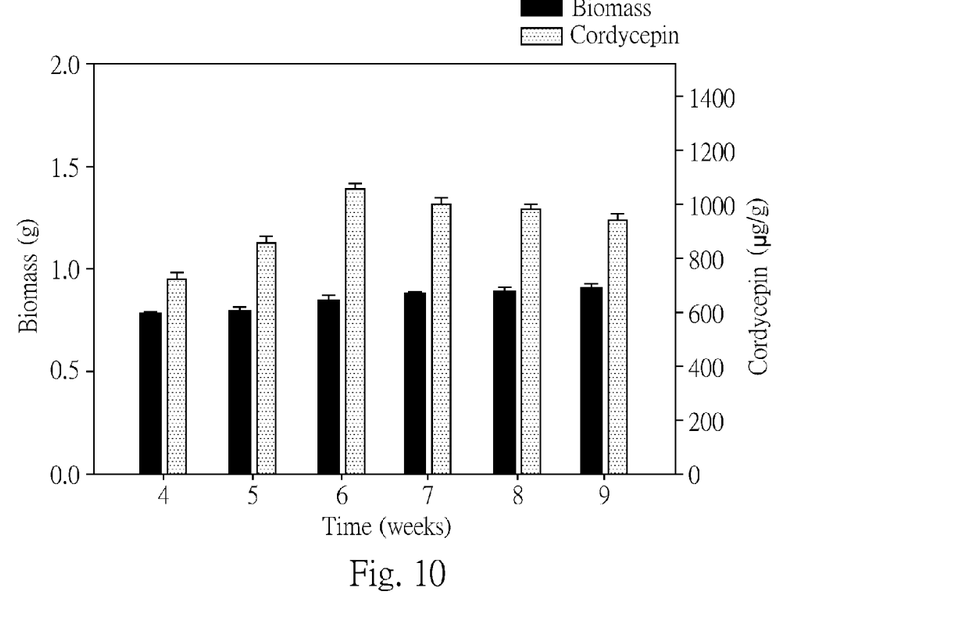
FIG. 10 is the content of cordycepin and the total amount of hyphae tested after four weeks under the light from different initiate point.

Result in FIG. 10 illustrated that when the light culture was for 4 weeks and started after 4 or 5 weeks of dark culture, it could increase the content of cordycepin in *O. sinensis*. However, when the light culture was for 4 weeks and started after 6, 7, 8 or 9 weeks of dark culture, it would decrease the content of cordycepin in *O. sinensis* in accord with the increasing weeks of dark culture.

Figure 11:
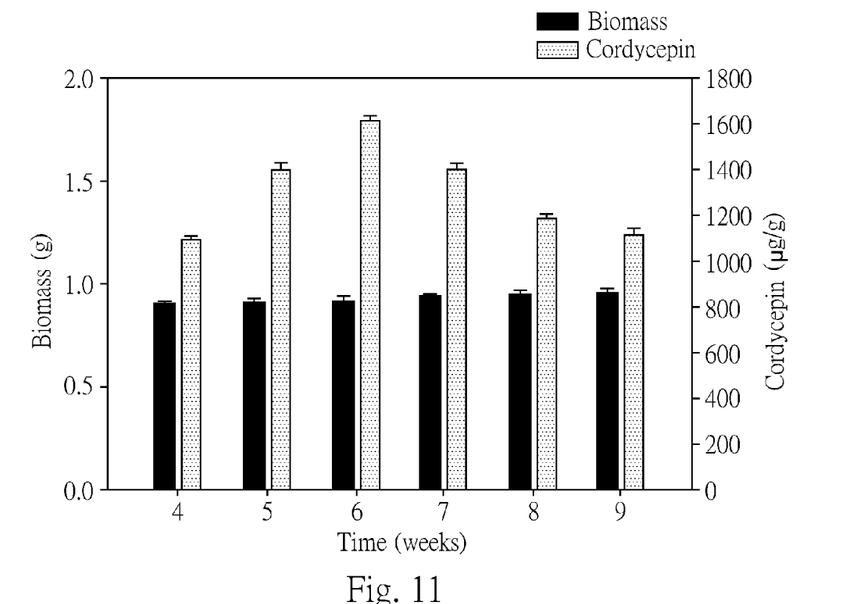
FIG. 11 is the content of cordycepin and the total amount of hyphae tested after eight weeks under the light from different initiate point.

Result in FIG. 11 shown that when *O. sinensis* was cultured under the light for 8 weeks after 4, 5 or 6 weeks of dark culture, it could increase the content of cordycepin in *O. sinensis*, but when *O. sinensis* was cultured under the light after 7, 8 or 9 weeks of dark culture, it would decrease the content of cordycepin in *O. sinensis*. Herein, when the time of dark culture was 9 weeks, the content of cordycepin in *O. sinensis* was the lowest.

Figure 12:
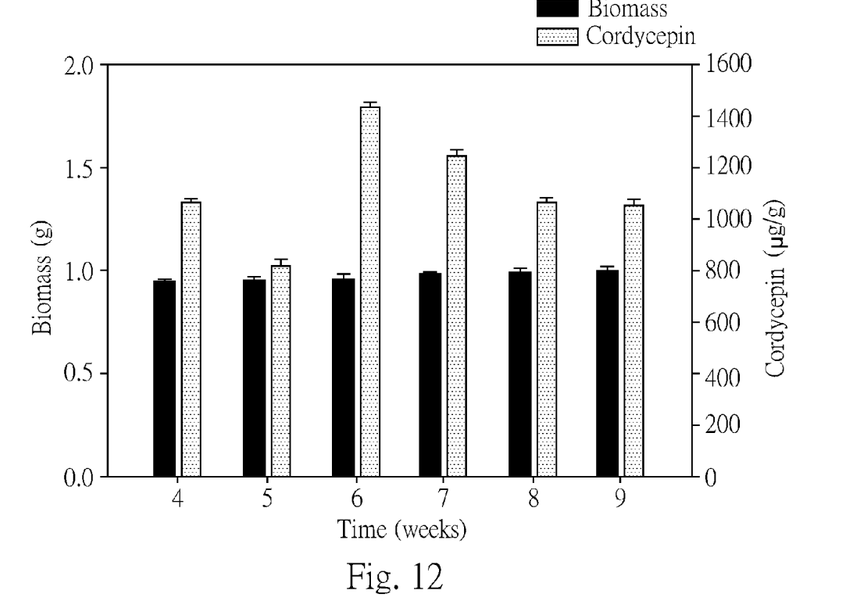
FIG. 12 is the content of cordycepin and the total amount of hyphae tested after twelve weeks under the light from different initiate point.

Result in FIG. 12 indicated that when *O. sinensis* was cultured in the dark for 4 or 5 weeks and then under the light for 12 weeks, the content of cordycepin in *O. sinensis* was decreased. But, when *O. sinensis* was cultured in the dark for 6 weeks and then under the light for 12 weeks, the content of cordycepin in *O. sinensis* was significantly increased. Moreover, when *O. sinensis* was cultured in the dark for 7, 8 or 9 weeks and then under the light for 12 weeks, the content of cordycepin in *O. sinensis* was decreased.

According to the results from FIGS. 10 to 12, it shown that culturing *O. sinensis* in the dark for 6 weeks and then culturing under the light could increase the content of cordycepin in *O. sinensis*, wherein it can obtain the highest amount of cordycepin in *O. sinensis* with about 1589.00 µg/g concentration by culturing under the light culture for 8 weeks.

Example 6: Light Test II

Based on the description in example 2, two prepared media were separately put into two culture containers. 20% of the total amount of *O. sinensis* inoculum from example 1 was inoculated into each of the culture container. The first group was cultured at dark room for continuously 8 weeks. The second group was cultured under 300 to 500 lux light intensity for 4 weeks after cultured at dark room for 4 weeks. The two group were both cultured at 20° C. temperature, 70~80% humidity. The content of adenosine, cordycepin and mannitol in each group were tested after cultured. The results were shown as FIG. 13.

Figure 13:
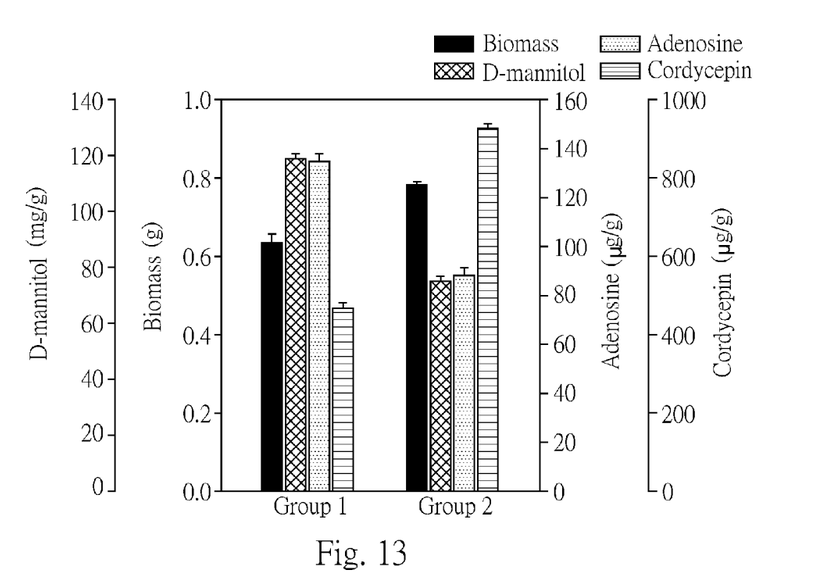
FIG. 13 is the content of cordycepin, adenosine, mannitol and the total amount of hyphae tested in each different group of *O. sinensis* cultured under different light conditions.

Result in FIG. 13 revealed that compared to the first group, the content of *O. sinensis* hyphae of the second group was about 0.15 gram excess, the content of adenosine of the second group was about 46.67 µg/g less, the content of cordycepin from the second group was about 44.05 mg/g less, and the content of mannitol from the second group was about 455.17 µg/g excess. Therefore, light is beneficial for solid state culture of *O. sinensis* to grow hyphae and synthesis cordycepin.

Example 7: Light Test III

Based on the description in example 2, three prepared media were separately put into three culture containers. 20% of the total amount of *O. sinensis* inoculum from example 1 was inoculated into each of the culture container. The first group was cultured at dark room for continuously 12 weeks. The second group was cultured under 300 to 500 lux light intensity for 4 weeks after cultured at dark room for 8 weeks. The third group was cultured under 300 to 500 lux light intensity for 8 weeks after cultured at dark room for 4 weeks. The three groups were all cultured at 20° C. temperature, 70~80% humidity. The content of adenosine, cordycepin and mannitol in each group were tested after cultured. The results were shown as FIG. 14.

Figure 14:
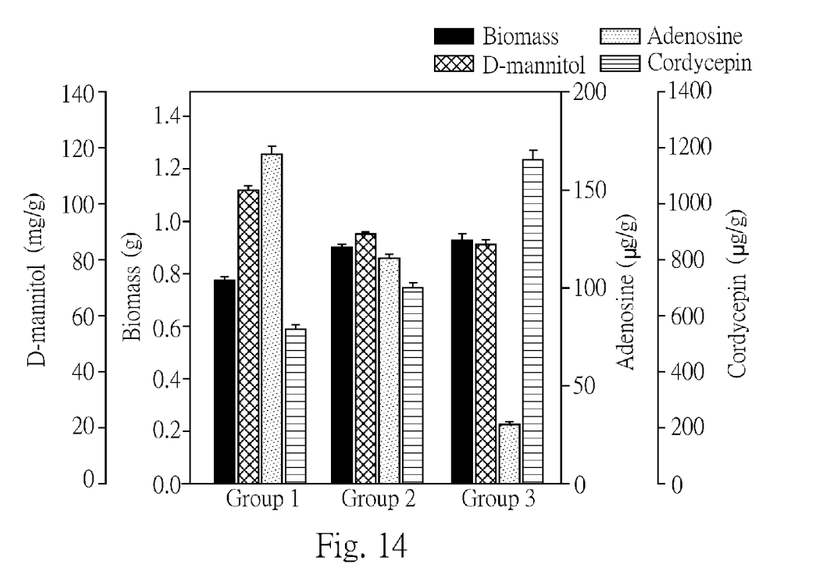
FIG. 14 is the content of cordycepin, adenosine, mannitol and the total amount of hyphae tested in each different group of *O. sinensis* cultured under different light conditions.

Please see FIG. 14, it shown that the content of mannitol in *O. sinensis* from the first group was 24.31 mg/g more than that from the second group and was 27.70 mg/g more than that from the third group. The content of adenosine from the first group was 53.83 μg/g more than that from the second group and was 135.33 μg/g more than that from the third group. The content of *O. sinensis* hyphae from the second group and the third group were both significantly higher than that from the first group. The content of cordycepin in *O. sinensis* from the third group was the highest, wherein the content of cordycepin in *O. sinensis* from the third group was about 1.63 times more than that from the second group and twice more than that from the first group. Specifically speaking, the content of cordycepin from the third group was about 441.00 μg/g more than that from the second group, and about 588.83 μg/g more than that from the first group.

To sum up, light is indeed beneficial for *O. sinensis* to generate cordycepin and grow mycelia. And by increasing of the light culture duration, production of cordycepin and growth of mycelia can be significantly increased.

Example 8: Light Test VI

Based on the description in example 2, four prepared media were separately put into four culture containers. 20% of the total amount of *O. sinensis* inoculum from example 1 was inoculated into each of the culture container. The first group was cultured at dark room for continuously 16 weeks. The second group was cultured under 300 to 500 lux light intensity for 4 weeks after cultured at dark room for 12 weeks. The third group was cultured under 300 to 500 lux light intensity for 8 weeks after cultured at dark room for 8 weeks. The fourth group was cultured under 300 to 500 lux light intensity for 12 weeks after cultured at dark room for 4 weeks. The four groups were all cultured at 20° C. temperature, 70~80% humidity. The content of adenosine, cordycepin and mannitol in each group were tested after cultured. The results were shown as FIG. 15.

Figure 15:
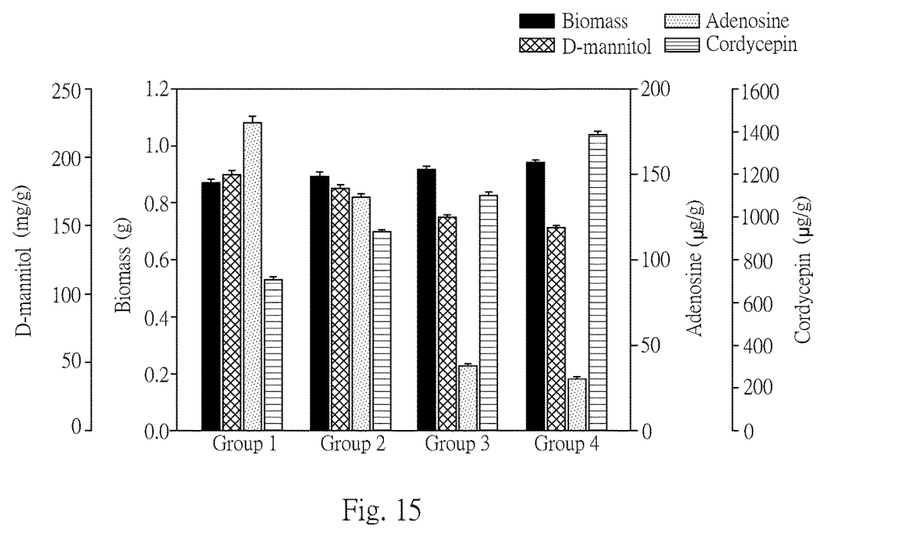
FIG. 15 is the content of cordycepin, adenosine, mannitol and the total amount of hyphae tested in each different group of *O. sinensis* cultured under different light conditions.

Result in FIG. 15 indicated that the content of *O. sinensis* hyphae among the four groups, the first group was the lowest, the second group was the second lowest, the third group and the fourth group were significantly increased. The content of mannitol was gradually decreased along with the increasing of light culture duration. So the content of mannitol from the first group was the highest, wherein the content of mannitol from the first group was 10.81 mg/g, 30.50 mg/g and 37.27 mg/g more than that from the second group, the third group and the fourth group, respectively. The content of adenosine from the first group was the highest, wherein the content of adenosine from the first group was 42.67 μg/g, 142.00 μg/g and 147.95 μg/g more than that from the second group to the fourth group, respectively. The content of cordycepin from the fourth group which was the highest was twice more than that from the first group. And the content of cordycepin from the fourth group was 673.85 μg/g more than that from the first group, 445.17 μg/g more than that from the second group and 271.00 μg/g more than that from the third group.

Therefore, light can increase the content of cordycepin in *O. sinensis* and the growth of hyphae during solid state culture. And by increasing of the light culture duration, growth rate of hyphae are getting better.

From results of these foresaid examples, it can be clearly proved that the method for culturing *O. sinensis* disclosed in this present invention has effect of increasing growth rate of *O. sinensis* and the content of its specific activity ingredient, so can efficiently improve the defect of slowly growth in the wild. On the other hand, the method for culturing *O. sinensis* disclosed in this present invention can harvest *O. sinensis* largely and steady by artificial solid state culture. And, the ingredient and composition of this artificial culture *O. sinensis* is very close to wild *O. sinensis* to reach the effect for lowering production costs and increasing economic efficiency.

The above-mentioned detailed description and specific examples are only for illustrating of this present invention. Any easy change or modification based on examples in the description by the person skilled in the art of this present invention will be included within the scope of following claims.

What is claimed is:

1. A method for culturing *Ophiocordyceps sinensis* includes inoculating a fungi inoculum to a medium, culturing under a culturing condition in the dark room for at least four weeks, and then culturing under light for at least four weeks, wherein the culturing condition includes humidity of 70~90%, wherein cordycepin content in the cultured *Ophiocordyceps sinensis* is at least 500 μg/g.

2. The method for culturing *Ophiocordyceps sinensis* according to claim 1, wherein an intensity of the light is 300~500 lux.

3. The method for culturing *Ophiocordyceps sinensis* according to claim 1, wherein the culturing condition includes temperature of 15~25° C.

4. The method for culturing *Ophiocordyceps sinensis* according to claim 3, wherein the temperature is at 20° C.

5. The method for culturing *Ophiocordyceps sinensis* according to claim 1, wherein a duration of culturing in the dark room is at least four weeks.

6. The method for culturing *Ophiocordyceps sinensis* according to claim 1, wherein a duration of culturing in the dark room is six weeks.

7. The method for culturing *Ophiocordyceps sinensis* according to claim 1, wherein a water content of the medium is 50~60%.

8. The method for culturing *Ophiocordyceps sinensis* according to claim 1, wherein the medium includes a powder substrate and a nitrogen source, the powder substrate is prepared by at least one plant from mixed grains, and the nitrogen source is selected from the group consisting of yeast extract and peptone.

9. The method for culturing *Ophiocordyceps sinensis* according to claim 1, wherein a duration of culturing under the light is four to twelve weeks.

10. The method for culturing *Ophiocordyceps sinensis* according to claim 9, wherein the duration of culturing under the light is eight weeks.

11. The method for culturing *Ophiocordyceps sinensis* according to claim 9, wherein the duration of culturing under the light is twelve weeks.

* * * * *